United States Patent
Grimon et al.

(10) Patent No.: US 11,093,879 B2
(45) Date of Patent: Aug. 17, 2021

(54) TASK MANAGEMENT SYSTEM OF AN AIRCRAFT CREW DURING A MISSION AND RELATED METHOD

(71) Applicant: DASSAULT AVIATION, Paris (FR)

(72) Inventors: Samuel Grimon, Saint Cloud (FR); Annik Ostrianine, Saint Cloud (FR); Florence Susset, Saint Cloud (FR)

(73) Assignee: DASSAULT AVIATION, Paris (FR)

( * ) Notice: Subject to any disclaimer, the term of this patent is extended or adjusted under 35 U.S.C. 154(b) by 125 days.

(21) Appl. No.: 16/508,284

(22) Filed: Jul. 10, 2019

(65) Prior Publication Data

US 2020/0019909 A1 Jan. 16, 2020

(30) Foreign Application Priority Data

Jul. 11, 2018 (FR) ..................................... 18 00732

(51) Int. Cl.
   *G06Q 10/06* (2012.01)
   *B64D 11/00* (2006.01)
   *G06Q 10/10* (2012.01)

(52) U.S. Cl.
   CPC ... *G06Q 10/06316* (2013.01); *B64D 11/0015* (2013.01); *G06Q 10/063118* (2013.01); *G06Q 10/1097* (2013.01)

(58) Field of Classification Search
   CPC .......... G06Q 10/00–50/00; B64D 1/00–47/00
   USPC ............................................... 705/7.11–7.42
   See application file for complete search history.

(56) References Cited

U.S. PATENT DOCUMENTS

| 5,475,594 | A | * | 12/1995 | Oder | ..................... | G05D 1/0055 340/971 |
| 5,978,715 | A | * | 11/1999 | Briffe | ..................... | G05D 1/0808 244/1 R |
| 6,038,498 | A | * | 3/2000 | Briffe | ..................... | G01C 23/00 244/1 R |

(Continued)

FOREIGN PATENT DOCUMENTS

| EP | 2405417 A2 | 1/2012 |
| FR | 2935818 A1 | 3/2010 |

(Continued)

OTHER PUBLICATIONS

Search Report for priority application FR1800732.

*Primary Examiner* — Alan S Miller
(74) *Attorney, Agent, or Firm* — Davidson, Davidson & Kappel, LLC

(57) ABSTRACT

A task management system of an aircraft crew during a mission includes a task sequencing module configured to acquire a first list of procedure tasks for normal and special missions to be performed during the mission, a second list of abnormal, emergency and deferred procedure tasks, to be performed in case of defect and/or failures, and a third list of additional tasks resulting from entries by the crew. The task sequencing module is configured for defining a priority order and/or a planning order between the tasks to be performed immediately from among the tasks of the first list, the second list and the third list. The display management assembly is configured to display a first overall task sequencing window including tasks from the first list, the second list and the third list ranked according to the priority order and/or according to the planning order.

19 Claims, 5 Drawing Sheets

(56) References Cited

U.S. PATENT DOCUMENTS

| | | | | |
|---|---|---|---|---|
| 8,306,675 | B2* | 11/2012 | Prus | G08G 5/0021 |
| | | | | 701/4 |
| 8,659,447 | B2* | 2/2014 | Francois | G06F 8/30 |
| | | | | 340/963 |
| 8,700,232 | B2* | 4/2014 | Caillaud | G08G 5/0052 |
| | | | | 701/3 |
| 8,838,294 | B2* | 9/2014 | Srivastav | G08G 5/0021 |
| | | | | 701/3 |
| 8,948,938 | B2* | 2/2015 | Chazottes | B64C 19/00 |
| | | | | 701/14 |
| 9,174,725 | B2* | 11/2015 | Porez | B64C 19/00 |
| 9,399,525 | B2* | 7/2016 | Mesguen | B64D 43/00 |
| 9,424,754 | B2* | 8/2016 | Srivastav | G09B 9/08 |
| 9,650,151 | B2* | 5/2017 | Giuliano | G05B 23/0243 |
| 10,705,684 | B2* | 7/2020 | Pandya | G06F 3/04847 |
| 2002/0143440 | A1* | 10/2002 | Salvado | G06Q 10/04 |
| | | | | 701/3 |
| 2007/0050225 | A1 | 3/2007 | Leslie | |
| 2007/0180394 | A1* | 8/2007 | Hedrick | G06F 3/04847 |
| | | | | 715/771 |
| 2007/0198141 | A1* | 8/2007 | Moore | G01D 5/342 |
| | | | | 701/3 |
| 2010/0066565 | A1* | 3/2010 | Francois | G06F 9/4881 |
| | | | | 340/963 |
| 2010/0161157 | A1* | 6/2010 | Guilley | G05B 23/0272 |
| | | | | 701/3 |
| 2011/0160937 | A1* | 6/2011 | Caillaud | G08G 5/0021 |
| | | | | 701/3 |
| 2011/0160938 | A1* | 6/2011 | Caillaud | G06Q 10/06 |
| | | | | 701/3 |
| 2012/0010765 | A1* | 1/2012 | Wilson | G01C 23/00 |
| | | | | 701/3 |
| 2012/0029736 | A1* | 2/2012 | Guilley | G06Q 10/06 |
| | | | | 701/3 |
| 2012/0029737 | A1 | 2/2012 | Marty et al. | |
| 2012/0310450 | A1* | 12/2012 | Srivastav | G09B 9/08 |
| | | | | 701/3 |
| 2012/0310524 | A1* | 12/2012 | Pepitone | G08G 5/0013 |
| | | | | 701/411 |
| 2013/0066487 | A1* | 3/2013 | Holder | G08G 5/0021 |
| | | | | 701/14 |
| 2013/0268878 | A1* | 10/2013 | Le Roux | G06F 3/0481 |
| | | | | 715/772 |
| 2014/0200748 | A1* | 7/2014 | Porez | B64C 19/00 |
| | | | | 701/3 |
| 2014/0359564 | A1* | 12/2014 | Francois | G06F 8/30 |
| | | | | 717/106 |
| 2015/0120090 | A1* | 4/2015 | Wischmeyer | G09B 5/02 |
| | | | | 701/3 |
| 2015/0332490 | A1* | 11/2015 | Coulmeau | G06T 11/206 |
| | | | | 701/3 |
| 2016/0047674 | A1* | 2/2016 | Ramaiah | G08G 5/0052 |
| | | | | 340/995.27 |
| 2016/0264256 | A1 | 9/2016 | Ramirez et al. | |
| 2016/0300551 | A1* | 10/2016 | Branthomme | G06F 3/04855 |
| 2017/0210484 | A1* | 7/2017 | Figard | B64D 45/00 |
| 2018/0075758 | A1 | 3/2018 | Martinez et al. | |
| 2018/0188051 | A1* | 7/2018 | Gaspard-Boulinc | G01C 21/3469 |
| 2018/0225616 | A1* | 8/2018 | Jones | G06N 5/045 |
| 2018/0292953 | A1* | 10/2018 | Pandya | G06F 3/0488 |

FOREIGN PATENT DOCUMENTS

| | | |
|---|---|---|
| FR | 2940482 A1 | 6/2010 |
| FR | 2954840 A1 | 7/2011 |
| FR | 2954847 A1 | 7/2011 |
| FR | 3033637 A1 | 9/2016 |
| FR | 3034860 A1 | 10/2016 |

\* cited by examiner

TASK MANAGEMENT SYSTEM OF AN AIRCRAFT CREW DURING A MISSION AND RELATED METHOD

The present disclosure relates to a task management system for an aircraft crew during a mission, including:
- a task sequencing module, configured for defining an execution order between tasks to be performed by the crew;
- a display device, and a display management assembly on the display, configured for displaying, on the display device, at least one task sequencing window according to the execution order defined by the task sequencing module.

Such a system is intended to lighten the workload for the crew of the aircraft during a mission to be performed.

BACKGROUND

To perform a mission, the crew of an aircraft must perform a large number of tasks before the flight, during the flight and afterwards.

In particular, the crew plans the mission, and sees it through by monitoring the navigation of the aircraft. The crew manages the communications with the outside, and sees to the proper working of the airplane systems. In case of defects or failures appearing on the aircraft, the crew takes the necessary measures to address the problems, in order to keep the aircraft in flight.

In certain situations, the crew manages orders received from air traffic control and/or orders received from air operations. Optionally, it handles personal tasks for passengers of the aircraft, such as reserving a hotel or a taxi.

The mission tasks performed in particular include carrying out procedures, in particular normal procedures performed during the flight during navigation, typically before taking on a new flight phase, or special procedures during specific navigation over an ocean or in downgraded weather conditions.

Other procedures are defect, failure or even emergency handling procedures. These procedures must sometimes be worked in among other tasks, and take priority when they relate to the safety of the aircraft.

The various tasks must be done using various interfaces, and are not necessarily carried out by the same crewmember.

It is therefore sometimes difficult for the crew of the aircraft to anticipate and easily plan all of the tasks to be carried out. In particular, the crew defines a priority order between the tasks. Furthermore, some procedures comprise actions to be carried out that are deferred until later in the flight. The crew must not forget to perform these deferred tasks.

Generally, the crew establishes mental lists of tasks to be performed, or uses paper media, which creates work, risks of errors and/or forgetfulness, and more generally, decreased efficiency.

In some cases, this can create complications for the crew, in particular when the number of tasks performed suddenly becomes greater, in extreme cases causing a "cliff effect" by which the crew finds itself having to handle too many tasks.

SUMMARY OF THE INVENTION

One aim of the present disclosure is therefore to simplify and lighten the crew's workload in managing its tasks, so that it has a better perception of all of its tasks. This will allow it inter alia to anticipate its current and future overall workload, and will thus promote the reduction of its workload.

To that end, a system of the aforementioned type is provided, wherein:
- the task sequencing module is configured to acquire at least a first list of procedure tasks for normal and special missions to be performed during the mission, a second list of abnormal, emergency and deferred procedure tasks, to be performed in case of defect and/or failures on the aircraft, and a third list of additional tasks resulting from entries by the crew;

wherein:
- the task sequencing module includes a prioritization submodule configured for defining a priority order between the tasks to be performed immediately from among the tasks of the first list, the second list and the third list; and/or
- the task sequencing module includes a planning submodule configured for defining a planning order between the tasks to be performed later from among the tasks of the first list, the second list and the third list;

and wherein:
- the display management assembly is configured to display a first overall task sequencing window including tasks from the first list, the second list and the third list ranked according to the priority order and/or according to the planning order.

The system according to the invention may comprise one or more of the following features, considered alone or according to any technically possible combination:
- the task sequencing module is configured to acquire a fourth list of takeoff authorization procedure tasks, and to define an execution order from among the tasks on the fourth list;
- the first overall sequencing window includes a region for displaying current tasks to be performed immediately from among the tasks on the first list, the second list and the third list, the current tasks being ranked according to the priority order defined by the second task prioritization module;
- the first overall sequencing window includes a region for displaying planned tasks to be performed later from among the tasks on the first list, the second list and the third list, the planned tasks being ranked according to the planning order defined by the task planning submodule;
- the task sequencing module is configured to acquire relevant mission data comprising waypoints of the aircraft during the mission and passage times at each waypoint, the task planning submodule being configured to determine an order among the relevant mission data and the planned tasks;
- the task planning submodule is configured to define, for each planned task, a time at which the task must be performed, the order among the relevant mission data and the planned tasks being defined based on passage times and times at which the tasks must be performed;
- the region for displaying planned tasks to be performed later includes a timescale representative of a time period of the mission, the relevant mission data and each planned task being displayed in sequence opposite the timescale;
- the display management assembly is configured to display a specific sequencing window for mission tasks, in which the tasks from the first list are displayed in the execution order defined by the task sequencing module, without displaying tasks from the second list and the third list;

the display management assembly is configured to display a specific sequencing window for abnormal, emergency and deferred procedure tasks, in which the tasks from the second list are displayed in the execution order defined by the task sequencing module, without displaying tasks from the first list and the third list;

each task displayed in the first overall sequencing window is configured to be selected individually by a user, the display management assembly being configured to display a task management interface after individual selection by a user;

said system according to the aforementioned type includes:
  a database for defining normal and special procedures configured to define the normal or special procedures to be applied based on a determined mission context; and
  a management module for normal and special procedures configured to query the database for defining normal and special procedures, a module for managing normal and special procedures being connected to at least one sensor of the aircraft configured to allow the determination of a mission phase;

and wherein:
  the module for managing normal and special procedures is configured to define, in real time, the first list including at least one normal or special procedure to be carried out based on data from the or each sensor allowing determining the mission phase, using the database for defining normal and special procedures; and
  the task sequencing module is configured to acquire the first list of tasks from the module for managing normal and special procedures;

said system according to the aforementioned type includes a module for connecting to a mission preparation system configured to develop tasks from the first task list from a database of normal and special procedure tasks based on a flight plan, a communication plan, and/or weather data, the module for managing normal and special procedures being configured to connect to the mission preparation system to acquire at least some of the tasks from the first list;

said system according to the aforementioned type includes:
  a database for defining abnormal and emergency procedures, configured to define at least one abnormal, emergency or deferred procedure based on an airplane state; and
  a management module for abnormal and emergency procedures configured to query the database for defining abnormal and emergency procedures, and connected to at least one sensor of the aircraft configured to allow the determination of an airplane state, and wherein:
  the module for managing abnormal and emergency procedures is configured to define, in real time, the second list of tasks including at least one abnormal, emergency or deferred procedure based on data from sensors allowing determining the airplane state, using the database to define abnormal and emergency procedures; and
  the task sequencing module is configured to acquire the second list of tasks from the module for managing abnormal and emergency procedures;

at least one task from the second task list corresponds to a first part of a procedure to be carried out immediately, at least one task from the second task list corresponding to a second deferred part of a procedure, to be carried out later; and the prioritization submodule is configured to define a priority order of the task corresponding to the first part of the procedure among the tasks to be performed immediately; and/or the planning submodule is configured to define a planning order of the task corresponding to the deferred second part of the procedure among the planned tasks to be performed later; and said system according to the aforementioned type comprises a module for verifying the execution compliance of the current task to be performed by the crew, configured for detecting the non-execution or the incorrect execution of a current task determined by the task sequencing module, the display management assembly being configured to display an alert window to the crew when the non-execution or the incorrect execution of the current task is detected by the verification module.

A task management method for an aircraft crew in an aircraft is also provided, including:

providing a system as defined above;

acquiring, by the task sequencing module, at least a first list of tasks resulting from normal and special mission procedures, a second list of tasks resulting from abnormal, emergency and deferred procedures, to be performed in case of defect and/or failures on the aircraft, and a third list of tasks resulting from manual entries by the crew;

defining, by the prioritization submodule, a priority order between the tasks to be performed immediately from among the tasks of the first list, the second list and the third list; and/or defining, by the planning submodule, a planning order between the tasks to be performed later from among the tasks of the first list, the second list and the third list;

displaying, by the display management assembly, a first overall task sequencing window including tasks from the first list, the second list and the third list ranked according to the priority order and/or according to the planning order.

BRIEF SUMMARY OF THE DRAWINGS

The invention will be better understood upon reading the following description, provided solely as an example and done in reference to the appended drawings, in which.

DETAILED DESCRIPTION

In the figures, the display screens are illustrative of actual aircraft systems, and are therefore in English, in accordance with the standard display in the aeronautics field. A translation into French of the relevant information is provided if necessary in the following description.

Figure 1:
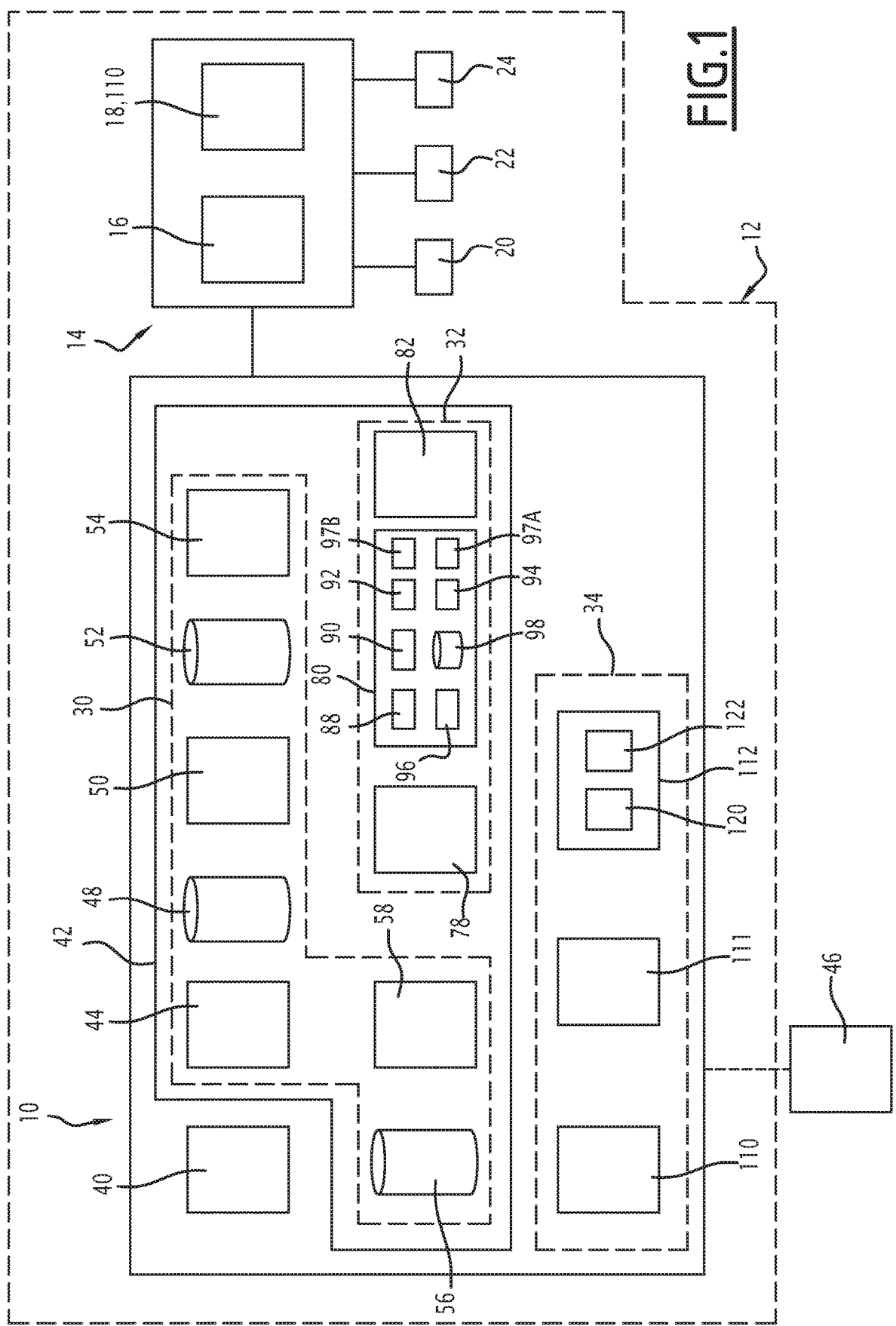
FIG. 1 is a block diagram illustrating a first task management system according to an embodiment of the invention.

A first task management system 10 for a crew of an aircraft 12 according to an embodiment of the invention is illustrated by FIG. 1.

The system 10 is intended to be connected to or integrated into a central avionics system 14 including a central avionics unit 16 and at least one display unit 18 placed in the cockpit of the aircraft 12.

The cockpit of the aircraft 12 is for example located in the aircraft 12 itself, or in a control room remote from the aircraft 12.

The central avionics unit 16 is in particular connected to equipment of the aircraft 12, intended to interact within functional systems of the aircraft.

The functional systems of the aircraft for example include measuring systems 20 of the aircraft, outside communication systems 22, and actuating systems 24 for controls of the aircraft.

The measuring systems 20 for example include components comprising sensors for measuring parameters outside the aircraft, such as the temperature, pressure or speed, sensors for measuring parameters inside the aircraft and at its various functional systems, and positioning sensors, such as GPS sensors, inertial units, and/or an altimeter.

The outside communication systems 22 for example components comprising include radio, VOR/LOC, ADS, DME, ILS systems, radar systems, and/or satellite communication systems such as "SATCOM".

The control systems 24 include components comprising actuators configured to actuate orders of the aircraft, such as flaps, control surfaces, pumps, or mechanical, electric and/or hydraulic circuits, and software actuators configured to configure the avionics states of the aircraft.

The various systems 20 to 24 are connected to the central avionics unit 14, for example digitally, by at least one data bus circulating on a network inside the aircraft.

The task management system 10 is intended to help the crew of the aircraft 12 in the planning of tasks to be performed during a mission of the aircraft, before the flight, during the flight, and after the flight.

The task management system 10 includes a unit 30 for collecting mission tasks and data, a unit 32 for sequencing tasks, intended to define at least one priority order and/or at least one planning order between the tasks collected by the collection unit 30, and a unit 34 for displaying at least one task sequencing window according to the priority order and/or according to the planning order.

In this example, the task management system 10 includes at least one processor 40 and at least one memory 42 containing software modules intended to be executed by the processor 40, to house the collection unit 30 and the sequencing unit 32.

With respect to the collection unit 30, the memory 42 contains a module 44 for connecting to a mission preparation system 46, at least one database 48 for defining normal and special procedures and a module 50 for managing normal and special procedures, configured to query the database 48 for defining normal and special procedures.

The memory 42 further contains at least one database 52 for defining abnormal and emergency procedures and a module 54 for managing abnormal and emergency procedures.

The memory 42 further advantageously contains at least one database 56 for defining takeoff authorization procedures, and a module 58 for managing takeoff authorizations.

In this example, the databases 48, 52, 56 are represented separately within the same memory 42. In a variant, these databases 48, 52, 56 can be grouped together within a same common database or on the contrary be distributed within several memories.

The mission preparation system 46 is for example an offboard system contained in a portable electronic device. In a variant or additionally, the mission preparation system 46 is a component of the avionic unit 14 of the aircraft, for example contained in the flight management system.

Figure 3:
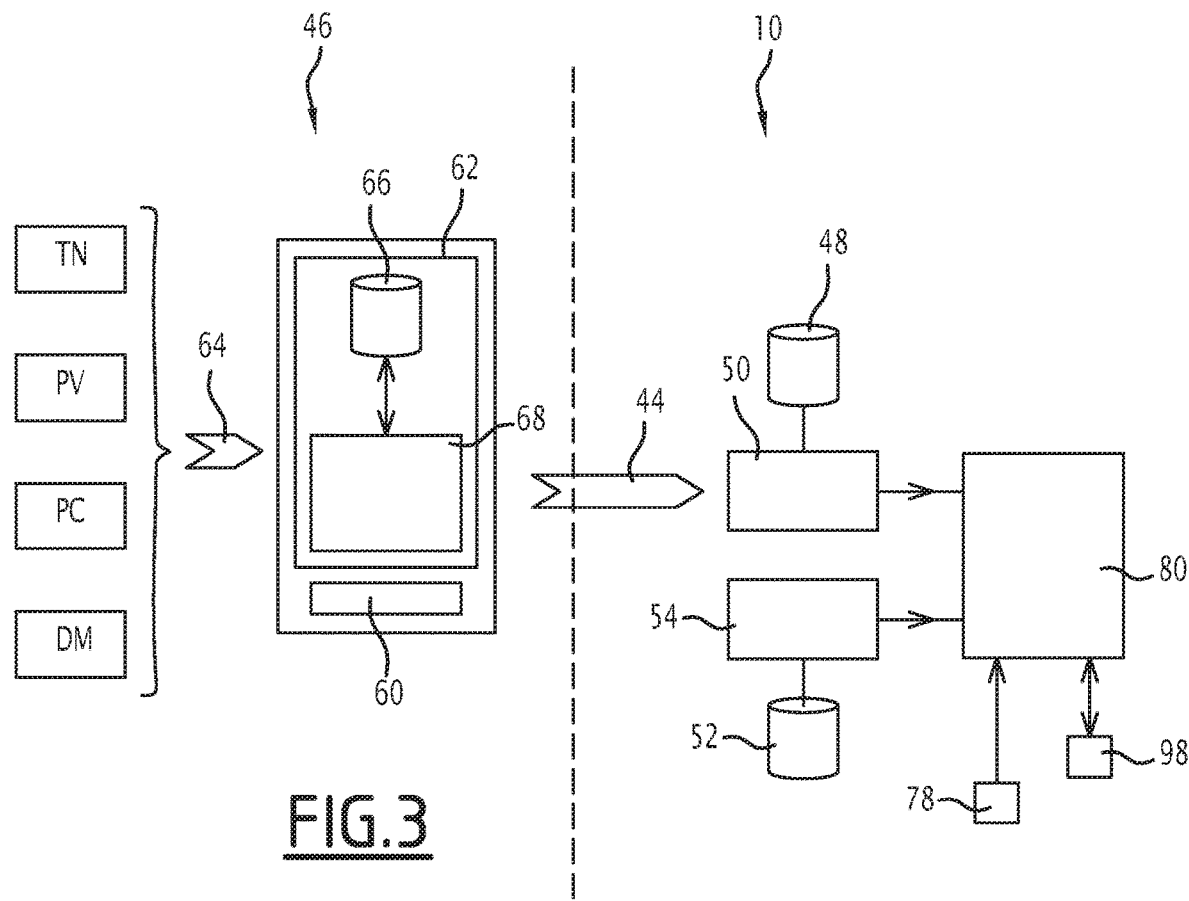
FIG. 3 is a view of interactions between a mission planning system and the system according to an embodiment of the invention.

In reference to FIG. 3, the mission preparation system 46 includes at least a processor 60 and a memory 62 containing software modules configured to be run by the processor.

It includes a module for loading mission planning data 64, a database 66 for defining tasks from mission planning, based on mission planning data, and a module 68 for managing tasks from mission planning to define a task list.

The mission planning data in particular comprises a flight plan PV including at least geographical waypoints of the aircraft during the mission, and passage times at the waypoints, a communication plan PC including geographical communication points and/or passage times at the geographical communication points, and weather data DM comprising geographical waypoints in weather phenomena; for example, in turbulence zones and/or storms and/or passage times at the geographical waypoints in the weather phenomena.

The mission planning data advantageously comprises a list of tasks TN corresponding to the execution of normal procedures and special procedures during the mission. These tasks will be referred to hereinafter as normal and special procedure tasks.

The normal tasks for example include a procedure for activating airplane systems, a taxi procedure, a takeoff procedure, a cruising procedure, a landing procedure, or more generally a procedure for going from one flight phase to another flight phase.

The special procedures include procedures in special weather conditions, for example a procedure in a turbulent phase, a procedure on a contaminated runway, a procedure under icy conditions.

The special procedures also include procedures under weather-related operating conditions, such as approach procedures with low visibility, or system-related special operating procedures, for example procedures with decreased noise upon departure or arrival.

The database 66 for defining tasks is configured to define an execution order among the normal and special procedure tasks. The execution order here is a planning order for the tasks based on the considered time and/or mission phase.

The mission phase is for example a ground phase, such as a taxi phase, or a flight phase, in particular a takeoff phase, a cruising phase, or a landing phase.

The task management module 68 is configured to load the mission planning data, in order to load the flight plan, the communication plan, the weather data, and the normal and special procedure tasks to be carried out for the mission being prepared.

It is configured to query the task definition database 66, in order to define a planning order between the normal and special procedure tasks defined for the mission, and optionally a task execution time during the mission.

The task management module 68 is also configured to define relevant mission data, including at least some of the waypoints during the mission, communication points during the mission, waypoints in weather phenomena, and to define a planning order between these relevant mission points, and more generally with respect to normal and special procedure tasks.

The task management module 68 is optionally configured to load personal tasks entered by the crew. The personal tasks are for example crew memos.

It is thus configured to create a task management plan comprising relevant planned mission data, normal and special procedure tasks to be performed, and personal tasks each associated with a planning order, a mission phase and/or a passage and/or execution time.

The connection module 44 is configured to connect the mission preparation system 46 to the normal and special procedure management module 50 for example using a Wi-Fi or Ethernet protocol, to allow the loading of mission procedure tasks in the normal and special procedure management module 50.

Figure 2:
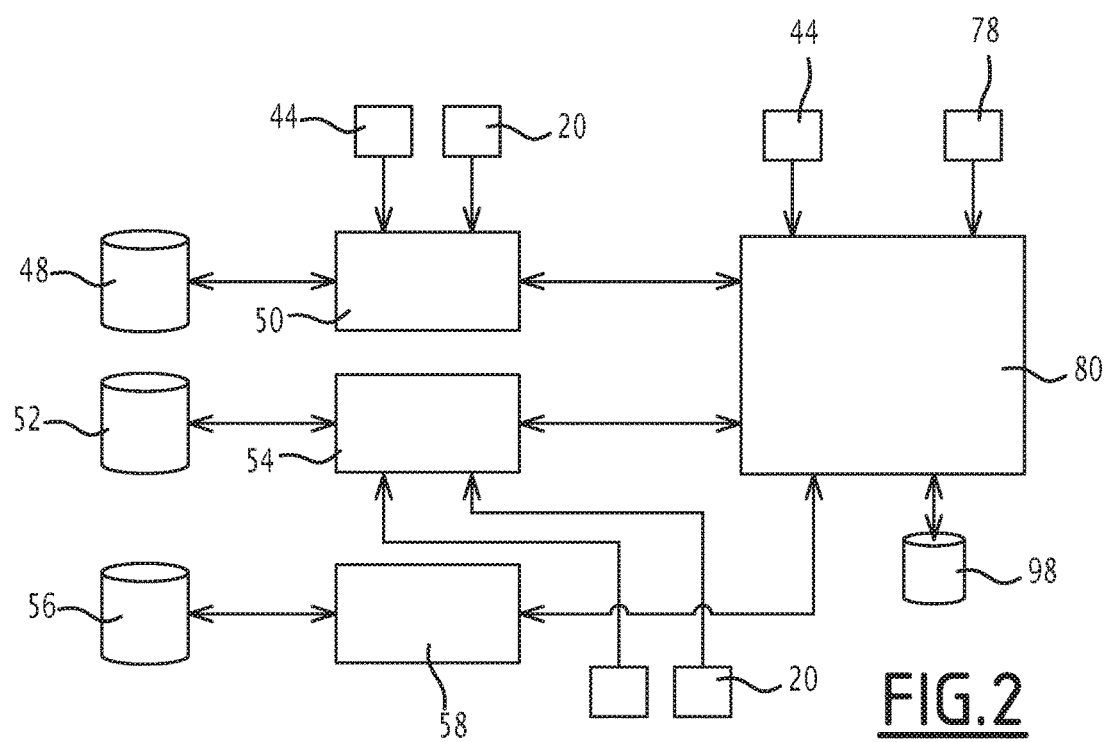
FIG. 2 is a schematic view illustrating interactions between elements of the system of FIG. 1.

In reference to FIGS. 1 and 2, the connection module 44 is further configured to connect the mission preparation system 46 to the sequencing unit 32, for example via a Wi-Fi or Ethernet protocol, to allow the loading of relevant mission data in the sequencing unit 32.

The database 48 for defining normal and special procedures contains the normal or special procedures to be applied based on a determined mission phase, on the ground or in flight.

The mission phase is for example characterized by special detection sensor data values of the aircraft 12. Thus, each phase of the mission in which the aircraft 12 is found is associated with a set of sensor data values.

The database 48 for defining normal and special procedures also advantageously includes procedure data including steps of procedures to be carried out.

The module for managing normal and special procedures 50 is configured to recover a first list of normal and special mission procedure tasks from the mission preparation system 46.

It is configured, during the mission, to query the sensors of the aircraft allowing determining the mission context, and to query the database 48 to determine, in the first task list, current tasks needing to be performed immediately, in light of the determined mission phase, with the priority order between these tasks, and to determine, in the first task list, current tasks that are planned, with the planning order between these tasks.

The normal and special procedure management module 50 is further configured to allow the crew to add, during the mission, normal or special procedure tasks into the first list of tasks.

The database for defining abnormal or emergency procedures 52 defines at least one abnormal or emergency procedure based on a determined airplane state associated with each abnormal or emergency procedure.

The abnormal or emergency procedures for example comprise an engine failure procedure, a hydraulic failure procedure, an electrical overheating procedure, etc.

The abnormal and emergency procedures comprise, in some cases, a first part to be carried out immediately, creating a current task to be performed immediately and at least one second part to be performed later, creating a task deferred to a later mission phase, in particular a later flight phase.

The airplane state is for example defined by messages from the crew alerting system (CAS) created by functional systems or by an airplane monitoring system, from sensors of the aircraft.

The airplane state is for example also defined by failures and/or defects not detected by the sensors, these failures and defects being characterized by observations by the crew, such as smoke, and being entered in the system 10.

The module for managing abnormal or emergency procedures 54 is configured to connect directly or indirectly to at least one sensor of the aircraft to determine an airplane state, for example based on at least one crew alerting message. It is configured to use the entries made by the crew of defects or failures not detected by the sensors.

The module for managing abnormal or emergency procedures 54 is configured to query the database for defining abnormal and emergency procedures 52 in order to determine a second list of abnormal, emergency or deferred procedures to be performed on the aircraft 12 based on the determined airplane state.

The module for managing abnormal or emergency procedures 54 is also configured to obtain, in the database of abnormal and emergency procedures 52, the current tasks needing to be performed immediately from among the tasks on the second list, as well as the priority order between the tasks. It is also configured to obtain, in the database of abnormal and emergency procedures 52, the planned tasks needing to be performed later, as well as the planning order between the tasks. This in particular includes the parts of procedures whereof the execution is deferred.

The database for defining takeoff authorizations 56 is configured to define lists of defects and takeoff authorization consequences, in particular a minimum list of equipment based on detected system failures, and/or sensor measurements of the aircraft.

The takeoff authorization management module 58 is configured to query the database for defining takeoff authorizations 56 and to connect directly or indirectly to sensors of the aircraft in order to determine a fourth additional list of takeoff authorization procedure tasks each associated with a defect and/or a failure on the aircraft, as well as a planning order between the takeoff authorization procedure tasks.

The sequencing unit 32 is also implemented by a processor of the system 10, and housed by at least one memory of the system 10 receiving software modules configured to be executed by the processor. In the example shown in FIG. 1, the or each processor used by the sequencing unit 32 is shared with the processor 60 used by the collection unit 30. Likewise, the or each memory housing the sequencing unit 32 is shared with the or each memory 62 housing the collection unit 30.

The memory 62 includes a module 78 for entry by the crew of additional tasks, a module 80 for overall task sequencing, and advantageously, a module 82 for verifying the execution compliance of the tasks.

The entry module 78 is configured to be activated by the crew to allow the entry of a third list of personal tasks by the crew. The personal tasks are for example crew memos.

The entry module 78 is configured to allow the entry by the crew of at least one definition of the personal task, a planning order of the personal task, a flight phase in which the personal task must be done and/or an execution time of the personal task.

The overall sequencing module 80 of the tasks includes an application 88 for activating the connection module 44 to allow the overall sequencing module 80 to load the relevant mission data from the mission preparation system 46, in particular the waypoints, the communication points, and the waypoints in the weather phenomena.

It includes an application 90 for loading a first task list from the module 50 for managing normal procedures, configured to recover the tasks from the first list, the status of each task from the first list chosen from among a current task to be performed immediately and a planned task to be performed later. The loading application 90 is configured to recover, for each current task, the priority order associated with the current task and for each planned task, the planning order defined among the tasks from the first list, the mission phase associated with the planned task and/or the anticipated execution time for the planned task.

The overall task sequencing module 80 also includes an application 92 for loading a second task list from the module 54 for managing abnormal and emergency procedures, configured to recover the tasks from the second list, the status of each task from the second list chosen from among a current task and a planned task. The loading application 92 is configured to recover, for each current task, the priority order associated with the current task and for each planned task, the planning order defined among the tasks from the second list, the mission phase associated with the planned task and/or the anticipated execution time for the planned task.

The sequencing module 80 further includes an application 94 for loading a third task list from the entry module 78, configured to recover the tasks from the third list, the status of each task from the third list chosen from among a current task and a planned task. The loading application 94 is configured to recover, for each current task, the priority order associated with the current task and for each planned task, the planning order defined among the tasks from the third list, the mission phase associated with the planned task, and/or the anticipated execution time for the planned task and/or the anticipated execution time for the planned task.

The overall sequencing module 80 further includes an application 96 for defining an overall execution order of the tasks, configured to sequence the tasks of the first list, the tasks of the second list, the tasks of the third list, optionally of the fourth list, and advantageously, the relevant mission data.

To that end, the task sequencing module 80 includes a prioritization submodule 97A configured for defining a priority order between the tasks to be performed immediately from among the tasks of the first list, the second list and the third list.

The task sequencing module 80 includes a planning submodule 97B configured for defining a planning order between the tasks to be performed later from among the tasks of the first list, the second list and the third list, and optionally the fourth list. The planning submodule 97B is further configured to sequence the relevant mission data among the planned tasks.

The submodules 97A, 97B are for example software applications configured to be executed by the processor 78.

The memory 62 advantageously contains a database 98 for defining a task order, defining, from an overall list of tasks to be performed immediately that may come from the first list, the second list, and the third list, a priority order between the tasks from the overall list to be performed immediately.

The database 98 for defining a task order further defines, from an overall list of tasks to be performed later that may come from the first list, the second list, the third list and/or the fourth list, a planning order between the tasks from the overall list to be performed later.

The module for verifying the execution compliance 82 is configured to determine whether a current task chosen from among the first list, the second list or the third list has been partially or fully performed, from data from sensors or from entries done by the crew. It is configured to create an alert, if the current task has not been performed, for example after a predetermined length of time.

The display unit 34 includes a display device 110 and display management assembly 112 on the display device 110. It advantageously includes a man-machine interface 111, such as a touchscreen, a keyboard and/or a management member of the cursor, such as a mouse.

The display device 110 is for example identical to the display 18 of the central avionics system 14, or made up of a screen or a specific window on the display 18 of the central avionics system 14.

The display management assembly 112 includes a processor 120 and a memory including software modules configured to be run by the processor 122.

Figure 4:
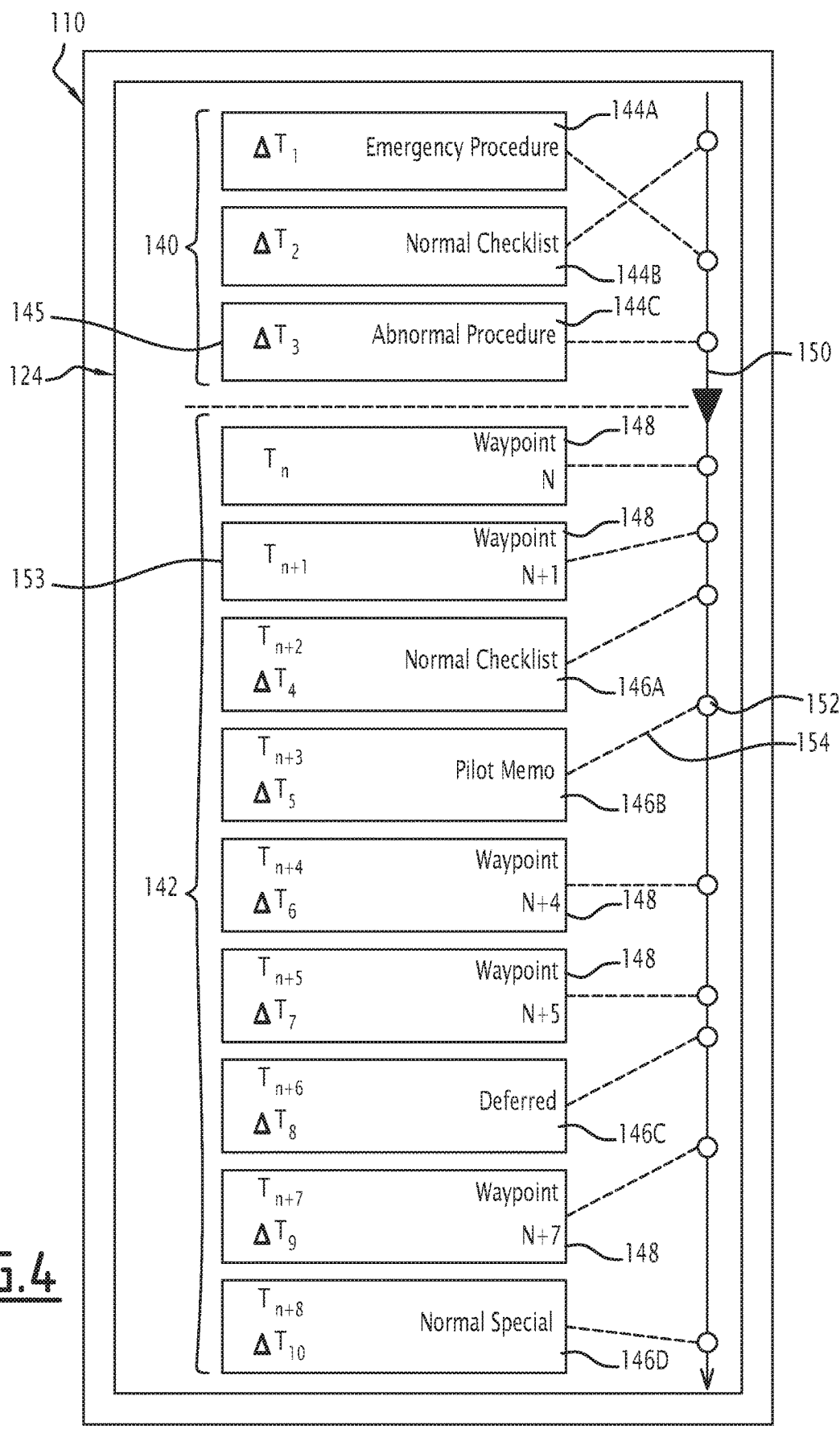
FIG. 4 is a view illustrating an overall sequencing window of the tasks obtained using the system of FIG. 1.

In reference to FIG. 4, the display management assembly 112 is configured to create the display, on the display device 110, of an overall sequencing window 124, summarizing the tasks from the first list, the second list, the third list, and advantageously, the relevant mission data.

Figure 5:
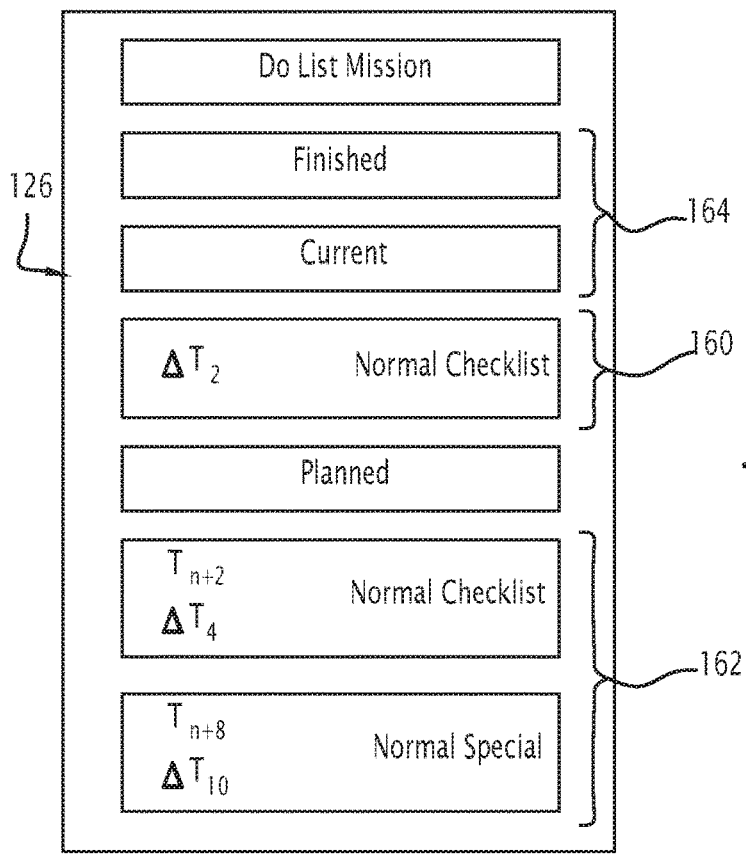
FIGS. 5 to 7 illustrate specific mission, defect and failure, and takeoff authorization sequencing windows.
Figure 6:
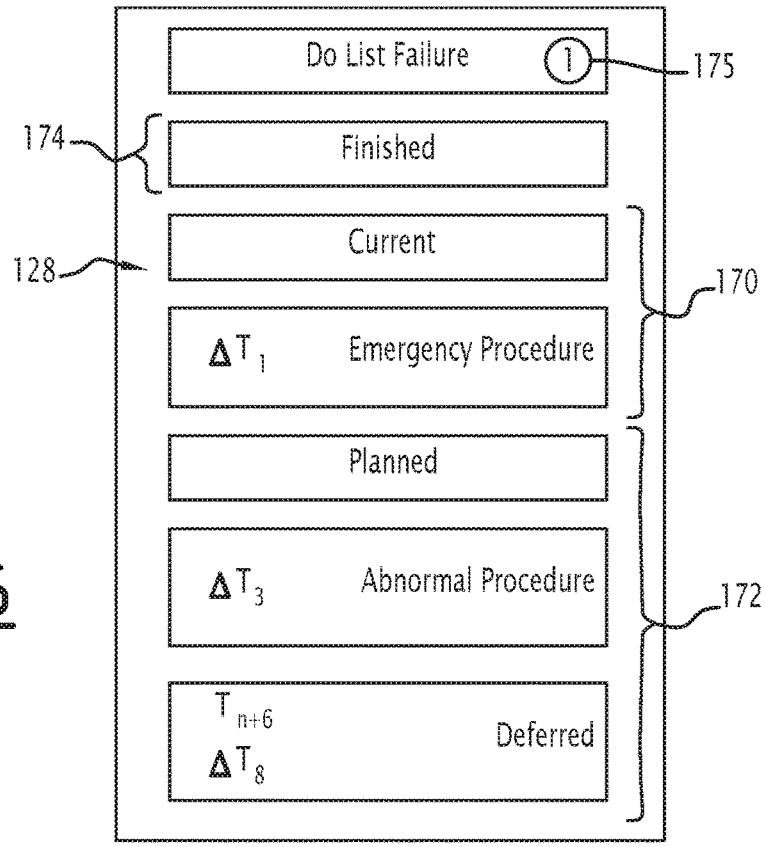
Figure 7:
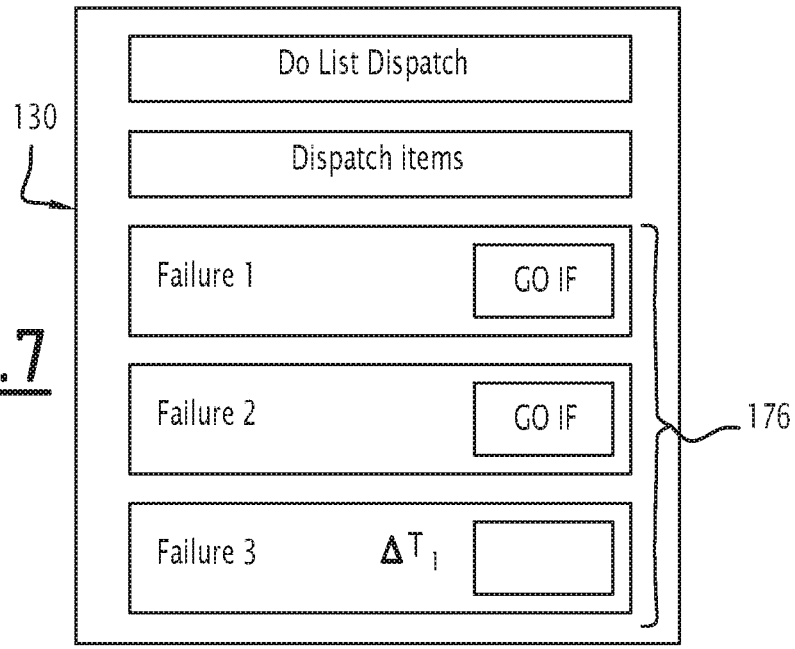

As illustrated in FIGS. 5 to 7, the display management assembly 112 is also configured to create the display, on the display device 110, of a specific sequencing window 126 for mission procedure tasks, a specific sequencing window 128 for sequencing abnormal, emergency and deferred procedure tasks, and a specific window 130 for sequencing takeoff authorization tasks.

Figure 8:
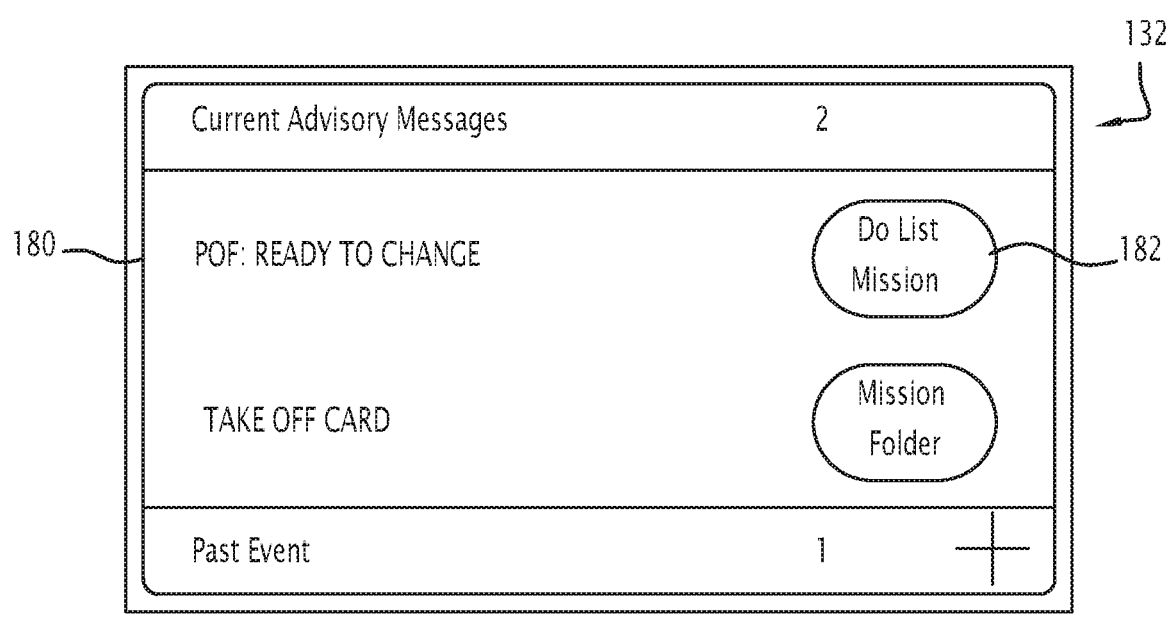
FIG. 8 illustrates a crew warning window.

In reference to FIG. 8, the display management assembly 112 is configured to create the display, on the display device 110, of at least one alert window 132 regarding the non-execution or partial execution of a task from among tasks from the first list, second list and third list.

An example overall sequencing window 124 is illustrated by FIG. 4. The window 124 includes a first permanent region 140 for displaying current tasks, and a second scrolling region 142 for displaying planned tasks, and advantageously, relevant mission data.

The display of the permanent region 140 is created by the display management assembly 112 based on the overall list of current tasks, the priority order of the current tasks and/or the execution time of the current tasks obtained from the overall sequencing module 80, taking into account all of the tasks from the first list, the second list, and the third list.

The permanent region 140 thus includes an overall list of current tasks 144A to 144C to be performed from among the tasks from the first list, the second list and the third list, sequenced according to their priority order obtained from the task sequencing module 80, for example from top to bottom.

Each current task to be performed is for example embodied by a box 145 configured to be selected by a crewmember to show an interface for performing the task.

For example, in FIG. 3, the permanent region 140 includes at least one emergency procedure task 144A to be performed, from the second list, a mission procedure task 144B to be performed, from the first list, and an abnormal procedure task 144C to be performed, from the second list, in the priority order of the tasks to be performed.

The display of the second region 142 is created by the display management assembly 112, based on the overall list of planned tasks, the planning order of the planned tasks, the mission phase and/or the execution time of the planned tasks obtained from the task sequencing module 80.

The display of the second region 142 is also created by the display management assembly 112, based on relevant mission data, the planning order of the relevant mission data and/or the execution time of the relevant mission data obtained from the task sequencing module 80.

Thus, the second region 142 includes an overall planned task list 146A, 146B, 146C, from among the tasks of the first list, the second list and the third list, sequenced based on their priority order and/or according to their planned execution time. It also advantageously includes an overall list of relevant mission data 148, sequenced by order of priority and/or according to planned time, and also sequenced among the tasks from the overall list of planned tasks. Each relevant mission datum is embodied by a box 153.

The planned tasks from the second list advantageously include a deferred task corresponding to the execution of a second part of a procedure whereof the first part creates a task to be performed immediately.

Advantageously, as shown in FIG. 4, the second region 142 includes a timescale 150, time markings 152 planned on the timescale 150 corresponding to each planned task and/or to each relevant mission datum and a linking segment 154 between the marking 152 and the respective boxes 145, 153 of the planned tasks and the relevant mission data.

When the second region 142 is too small to show all of the planned tasks and relevant mission data, the user is able to cause the successive planned tasks and/or the relevant mission data to scroll in the second region 142 in order to show only some of the successive planned tasks and/or relevant mission data.

The display of the specific sequencing window 126 is created by the display management assembly 112, based on the first task list obtained from the module for managing normal and special procedures 50, the status of each task chosen from among a current task and a planned task, and the priority or planning order between the tasks.

In reference to FIG. 5, the specific sequencing window 126 thus includes a first window 160 for displaying current tasks from the first list, a region 162 for displaying planned tasks from the first list and, advantageously, a selectable region 164 for displaying tasks from the first list that have already been performed.

The display of the specific sequencing window 128 is created by the display management assembly 112 based on the second task list obtained from the module for managing abnormal and emergency procedures 54, the status of each task chosen from among a current task and a planned task, and the priority or planning order between the tasks.

In reference to FIG. 6, the specific sequencing window 128 thus includes a first window 170 for displaying current tasks from the second list, a region 172 for displaying planned tasks from the second list and, advantageously, a selectable region 174 for displaying tasks from the second list that have already been performed.

Advantageously, in the example illustrated by FIG. 7, the specific sequencing window 128 includes an indicator 175 of the number of tasks from the second list that have not been performed, in particular an indicator 175 of the number of tasks deferred from the second list.

The display of the specific sequencing window 130 is created by the display management assembly 112, based on the fourth task list obtained from the module for managing takeoff authorizations 58, and the planning order between the tasks.

In reference to FIG. 7, the specific sequencing window 130 thus includes a region 176 for displaying tasks to be performed from the fourth list.

The display of the alert window 132 is created by the display management assembly 112, for each alert created by the execution compliance verification module 82 corresponding to an unperformed task or a partially performed task.

As illustrated in FIG. 8, the alert window 132 thus includes a list 180 of unperformed, or partially performed, tasks, and advantageously an access button 182 to a management interface of the task.

The operation of the task management system 10, during a mission of an aircraft 12, will now be described.

Initially, during the planning of the mission, the crew uses the mission preparation system 46 in order to define sequencing data of the mission comprising a flight plan PV including at least geographical waypoints of the aircraft during the mission, and passage times at the waypoint, a communication plan PC including geographical communication points and/or passage times at the geographical communication points, and weather data DM comprising geographical waypoints in weather phenomena, for example, in turbulence zones and/or storms and/or passage times at the geographical waypoint in the weather phenomena.

The mission preparation system 46 is further supplied with a list of normal and special procedure tasks TN to be performed during the mission, as defined above. It is advantageously supplied with additional tasks resulting from entries by the crew.

The task management module 68 queries the task definition database 66, in order to define a planning order between the normal and special procedure tasks defined for the mission, and optionally a task execution time during the mission.

The task management module 68 defines relevant mission data, including at least some of the waypoints during the mission, communication points during the mission, waypoints in weather phenomena, and defines a planning order between the relevant mission points, and more generally between the normal and special procedure tasks and the relevant mission data.

The task management module 68 creates a mission procedure task management plan comprising relevant planned mission data, and normal and special procedure tasks to be performed, each associated with a planning order, a mission phase and/or a passage and/or execution time.

Next, as illustrated in FIG. 3, the crew activates the connection module 44. The module for managing normal and special procedures 50 recovers a first list of normal and special mission procedure tasks from the mission preparation system 46 and optionally, a third list of additional tasks resulting from manual entries by the crew in the mission preparation system 46.

During the mission, the module for managing normal and special procedures 50 further loads the mission procedure tasks added by the crew to include them in the first task list.

Likewise, during the mission, the entry module 78 is activated by the crew to allow the entry of a third list of personal tasks by the crew.

During the mission, the module for managing normal and special procedures 50 directly or indirectly queries, in real time, at least one sensor of the aircraft configured to allow the determination of the mission phase, and at the same time queries the database 48 in order to determine, in the first task list, the current tasks that must be performed immediately, in light of the mission phase, with the priority order between these tasks, and in order to determine, in the first task list, the planned tasks to be performed later, with the planning order between these tasks.

Likewise, the module for managing abnormal or emergency procedures 54 directly or indirectly queries, in real time, at least one sensor of the aircraft configured to allow the determination of an airplane state, for example based on crew alerting messages, or from entries by the crew of defects or failures not detected by the sensors.

At the same time, the module for managing abnormal or emergency procedures 54 queries the database of abnormal and emergency procedures 52 in order to determine a second list of abnormal, emergency procedures to be performed on the aircraft 12 based on the determined airplane state.

The module for managing abnormal or emergency procedures 54 obtains, in the database of abnormal and emergency procedures 52, the current tasks needing to be performed immediately from among the tasks on the second list, as well as the priority order between the tasks. It also obtains, in the database of abnormal and emergency procedures 52, the planned tasks needing to be performed later, as well as the planning order between these tasks. These tasks advantageously include a deferred task corresponding to the execution of a second part of a procedure whereof the first part creates a task to be performed immediately.

The activation application 88 of the connection module 44 is activated by the overall task sequencing module 80 to load the relevant mission data from the mission preparation system 46, in particular the waypoints, the communication points, and the waypoints in the weather phenomena.

The application 90 for loading a first task list from the module 50 for managing normal procedures recovers the tasks from the first list, the status of each task from the first list chosen from among a current task and a planned task. The loading application 90 recovers, for each current task, the priority order associated with the task and for each planned task, the planning order defined among the tasks from the first list, the mission phase associated with the planned task and/or the anticipated execution time for the task.

The application 92 for loading a second task list from the module 54 for managing abnormal and emergency procedures, recovers the tasks from the second list, the status of each task from the second list chosen from among a current task and a planned task. The loading application 92 recovers, for each current task, the priority order associated with the task and for each planned task, the planning order defined among the tasks from the second list, the mission phase associated with the planned task, and/or the anticipated execution time for the task.

The application 94 for loading the third task list from the entry module 78 recovers the tasks from the third list, the status of each task from the third list chosen from among a current task and a planned task. The loading application 94 recovers, for each current task, the priority order associated with the task and for each planned task, the planning order defined among the tasks from the third list, the mission phase associated with the planned task, and/or the anticipated execution time for the task and/or the anticipated execution time for the task.

Based on the tasks recovered by the applications 88, 90, 92, 94, the application 96 for defining an overall execution order of the tasks, sequences the tasks from the first list, the tasks from the second list, the tasks from the third list, and advantageously, the relevant mission data according to an overall execution order, advantageously by querying the task order definition database 98.

The prioritization submodule 97A defines a priority order between the tasks to be performed immediately from among the tasks of the first list, the second list and the third list.

The planning submodule 97B defines a planning order between the tasks to be performed later from among the tasks of the first list, the second list and the third list, and optionally the fourth list.

The display management assembly 112 then recovers, in real time, an overall list of tasks and advantageously of relevant mission data, a status of each task chosen from among a current task and a planned task, and an overall execution order of the tasks from the task sequencing module 80. This overall execution order is a priority order for the current tasks to be performed immediately and a planning order for the planned tasks to be performed later and for the relevant mission data.

On this basis, the display management assembly 112 creates and displays, on the display device 110, the overall sequencing window 124 as defined above, with the region 140 for displaying current tasks and the region 142 for displaying planned tasks and relevant mission data.

The crew can therefore consult, in real time in a single window 124, the list of current tasks that it must perform immediately, whether these tasks are mission tasks that depend on the mission phase and in particular the flight phase, tasks for addressing defects and/or failures, which depend on the airplane state, or personal tasks set out by the crew.

In the display region 140 of the window 124, the current tasks are sequenced relative to one another by the order of priority defined by the prioritization submodule 97A, which allows the crew to have execution priorities quickly, very greatly lightening its workload.

All of the procedures, whether normal, special, abnormal or emergency, are addressed and sequenced in the same way and can be managed identically by the crew. In particular, the crew can have access to the interface necessary to perform each task from a simple selection of the task in the window 124.

In the display region 142 of the window 124, the planned tasks, whether they are mission tasks that depend on the mission context, tasks for addressing defects and failures, which can be deferred tasks, or personal tasks, are planned according to the planning order defined by the planning submodule 97B, allowing the crew to anticipate the overall workload of the crew.

All of the planned tasks, including those entered directly by the crew in the third task list, are visible in the display region 142.

Furthermore, the tasks of the second list that are deferred by the crew for lack of time, are automatically re-planned by the overall sequencing module 80, which ensures that the crew does not forget to address these tasks when it has more time.

This allows the crew to even out its workload, potentially by anticipating the execution of future tasks or by re-planning tasks.

If a crew member is temporarily inactive, for example because he is sleeping or because he is in the cabin, he can quickly see the tasks performed during his absence by looking at the task history via the windows 126, 128 as well as the rest of the tasks to be performed.

Thus, the crew workload is decreased and optimized, producing an overall improvement in safety, while in particular reducing the risk of cliff effect.

Upon selection by the crew, the display generating assembly 110 selectively displays one of the specific mission sequencing windows 126, 128, 130, to allow the crew selectively to examine the list of mission tasks, the list of failure and defect handling tasks, and the list of takeoff authorization tasks.

In particular, the crew can quickly determine, using the indicator 175, the number of tasks remaining to be performed in the window 128.

Also in real time, the verification module 82 determines whether current tasks have not been performed, or have been performed partially, and creates corresponding alerts. This is for example the case when a task is awaiting handling and has not been handled, for example after a determined length of time, or when an inconsistent action has been detected, for example a procedure not completed during the alignment of the aircraft before takeoff.

Upon reception of an alert, the display management assembly 112 creates and displays, on the display device 110, an alert window 132 that notifies the crew of the non-execution or partial execution of a task.

For example, when the crew has received, via a communication system with air traffic control, an authorization to fly at a predetermined flight level upon passing by a given waypoint and the crew forgets to perform the passage to this flight level at the given waypoint, an alert window 132 alerts the crew that the change in flight level has not been done, before air traffic control alerts the crew.

The crew nevertheless remains master of the task management, and can then decide to perform, delete, or delay the execution of the task.

However, the crew is replaced in the operational context in case of error or omission regarding the execution of a task.

In one variant, the modules of the system 10 are each made in the form of a programmable logic component, such as an FPGA (Field Programmable Gate Array), or in the form of a dedicated integrated circuit, such as an ASIC (Application Specific Integrated Circuit).

In the example described above, the task sequencing module 80 includes a prioritization submodule 97A configured to define a priority order between the tasks to be performed immediately among the tasks from the first list, the second list and the third list and includes a planning submodule 97B configured to define a planning order between the tasks to be performed later from among the tasks of the first list, the second list and the third list.

In this case, the display management assembly 112 is configured to display a first overall task sequencing window 124 including tasks from the first list, the second list and the third list ranked according to the priority order and according to the planning order.

In a variant, the task sequencing module 80 includes only a prioritization submodule 97A configured to define a priority order between the tasks to be performed immediately among the tasks from the first list, the second list and the third list or includes only a planning submodule 97B configured to define a planning order between the tasks to be performed later from among the tasks of the first list, the second list and the third list.

In this case, the display management assembly 112 is configured to display a first overall task sequencing window 124 including tasks from the first list, the second list and the third list respectively ranked according to the priority order or according to the planning order.

What is claimed is:

1. A task management system of an aircraft crew during a mission, the task management system being connected to or integrated into a central avionics system and comprising:
   a task sequencing module configured for defining an execution order between tasks to be performed by the crew; and
   a display device, and a display management assembly configured for displaying, on the display device, at least one task sequencing window according to the execution order defined by the task sequencing module,
   the task sequencing module being configured to acquire at least a first list of procedure tasks for normal and special missions to be performed during the mission, a second list of abnormal, emergency and deferred procedure tasks, to be performed in case of defect and/or failures on the aircraft, and a third list of additional tasks resulting from entries by the crew;
   the task sequencing module being configured to determine, in each task lists, tasks needing to be performed immediately, during a determined current mission phase, and to determine, in each task lists, tasks to be performed later, during a later mission phase, the determined current mission phase being updated in real time by querying at least one sensor of the aircraft;
   the task sequencing module including a prioritization submodule configured for defining a priority order between the determined tasks to be performed immediately from among the tasks of the first list, the second list and the third list, and/or the task sequencing module includes a planning submodule configured for defining a planning order between the determined tasks to be performed later from among the tasks of the first list, the second list and the third list;
   the display management assembly being configured to display, in a cockpit of the aircraft, a first overall task sequencing window including the tasks of the first list, the second list and the third list ranked according to the priority order and/or according to the planning order.

2. The system according to claim 1, wherein the task sequencing module is configured to acquire a fourth list of takeoff authorization procedure tasks, and to define the execution order from among the takeoff authorization procedure tasks on the fourth list.

3. The system according to claim 1, wherein the first overall sequencing window includes a region for displaying current tasks to be performed immediately from among the tasks of the first list, the second list and the third list, the current tasks being ranked according to the priority order defined by the prioritization submodule.

4. The system according to claim 1, wherein the first overall sequencing window includes a region for displaying planned tasks to be performed later from among the tasks of the first list, the second list and the third list, the planned tasks being ranked according to the planning order defined by the planning submodule.

5. The system according to claim 4, wherein the task sequencing module is configured to acquire relevant mission data comprising waypoints of the aircraft during the mission and passage times at each waypoint, the planning submodule being configured to determine an order among the relevant mission data and the planned tasks.

6. The system according to claim 5, wherein the planning submodule is configured to define, for each planned task, a time at which the planned task must be performed, the order among the relevant mission data and the planned tasks being defined based on the passage times and the times at which the tasks must be performed.

7. The system according to claim 5, wherein the region for displaying planned tasks to be performed later includes a timescale representative of a time period of the mission, the relevant mission data and each planned task being displayed in sequence opposite the time scale.

8. The system according to claim 1, wherein the display management assembly is configured to display a specific sequencing window for mission tasks, in which the tasks on the first list are displayed in the execution order defined by the task sequencing module, without displaying the tasks from the second list and the third list.

9. The system according to claim 1, wherein the display management assembly is configured to display a specific sequencing window for the abnormal, emergency and deferred procedure tasks, in which the tasks on the second list are displayed in the execution order defined by the task sequencing module, without displaying the tasks on the first list and the third list.

10. The system according to claim 1, wherein each of the tasks on the first list, the second list and the third list displayed in the first overall sequencing window is configured to be selected individually by a user, the display management assembly being configured to display a task management interface after the individual selection by a user.

11. The system according to claim 1, further comprising:
a database for defining normal and special procedures configured to define the normal or special procedures to be applied based on a determined mission context; and
a management module for normal and special procedures configured to query the database for defining normal and special procedures, the module for managing normal and special procedures being connected to at least one sensor of the aircraft configured to allow the determination of a mission phase,
wherein the module for managing normal and special procedures is configured to define, in real time, the first list including at least one normal or special procedure to be carried out based on data from the or each sensor allowing determining the mission phase, by using the database for defining normal and special procedures,
wherein the task sequencing module is configured to acquire the first list of tasks from the module for managing normal and special procedures.

12. The system according to claim 11, further comprising a module for connecting to a mission preparation system configured to determine the procedure tasks of the first list from a database of normal and special procedure tasks based on a flight plan, a communication plan, and/or weather data, the module for managing normal and special procedures being configured to connect to the mission preparation system to acquire at least some of the tasks from the first list.

13. The system according to claim 1, including:
a database for defining abnormal and emergency procedures, configured to define at least one abnormal, emergency or deferred procedure based on an airplane state; and
a management module for abnormal and emergency procedures configured to query the database for defining abnormal and emergency procedures, and connected to at least one sensor of the aircraft to allow the determination of an airplane state,
wherein the module for managing abnormal and emergency procedures is configured to define, in real time, the second list of tasks including at least one abnormal, emergency or deferred procedure based on data from sensors allowing determining the airplane state, by using the database to define abnormal and emergency procedures, and
wherein the task sequencing module is configured to acquire the second list of tasks from the module for managing abnormal and emergency procedures.

14. The system according to claim 1, wherein:
at least one of the tasks from the second task list corresponds to a first part of a procedure to be carried out immediately and at least one of the tasks from the second task list corresponds to a second deferred part of a procedure, to be carried out later,
the prioritization submodule is configured to define a priority order of the task corresponding to the first part of the procedure among the tasks to be performed immediately, and/or
the planning submodule is configured to define a planning order of the task corresponding to the second deferred part of the procedure among planned tasks to be performed later.

15. The system according to claim 1, further comprising a verification module for verifying an execution compliance of a current task to be performed by the crew, configured for detecting the non-execution or the incorrect execution of the current task determined by the task sequencing module, the display management assembly being configured to display an alert window to the crew when a non-execution or an incorrect execution of the current task is detected by the verification module.

16. The system according to claim 1, wherein the first overall sequencing window includes a region for displaying current tasks to be performed immediately from among the tasks of the first list, the second list and the third list, the current tasks being ranked according to the priority order defined by the prioritization submodule, and, wherein the first overall sequencing window includes a region for displaying planned tasks to be performed later from among the tasks of the first list, the second list and the third list, the planned tasks being ranked according to the planning order defined by the planning submodule.

17. A task management method for an aircraft crew in an aircraft, including:
providing the system according to claim 1;
acquiring, by the task sequencing module, at least the first list of tasks resulting from normal and special mission procedures, the second list of tasks resulting from abnormal, emergency and deferred procedures, to be performed in case of defect and/or failures on the aircraft, and the third list of tasks resulting from manual entries by the crew;
determining, in each task lists, tasks needing to be performed immediately, during a determined current mission phase, and determining, in each task lists, tasks to be performed later, during a later mission phase;
defining, by the prioritization submodule, the priority order between the determined tasks to be performed immediately from among the tasks of the first list, the second list and the third list; and/or
defining, by the planning submodule, the planning order between the determined tasks to be performed later from among the tasks of the first list, the second list and the third list; and
displaying, by the display management assembly, the first overall task sequencing window including tasks from the first list, the second list and the third list ranked according to the priority order and/or according to the planning order.

18. A task management system of an aircraft crew during a mission, the task management system being connected to or integrated into a central avionics system of the aircraft, the task management system comprising:
   a task sequencing module configured for defining an execution order between tasks to be performed by the crew; and
   a display device, and a display management assembly configured for displaying, on the display device, at least one task sequencing window according to the execution order defined by the task sequencing module,
   the task sequencing module being configured to acquire at least a first list of procedure tasks for normal and special missions to be performed during the mission, a second list of abnormal, emergency and deferred procedure tasks, to be performed in case of defect and/or failures on the aircraft, and a third list of additional tasks resulting from entries by the crew;
   the task sequencing module including a prioritization submodule configured for defining a priority order between the tasks to be performed immediately from among the tasks of the first list, the second list and the third list, and/or the task sequencing module includes a planning submodule configured for defining a planning order between the tasks to be performed later from among the tasks of the first list, the second list and the third list;
   the display management assembly being configured to display, in a cockpit of the aircraft, a first overall task sequencing window including the tasks of the first list, the second list and the third list ranked according to the priority order and/or according to the planning order;
   wherein the task sequencing module is configured to acquire a fourth list of takeoff authorization procedure tasks, and to define the execution order from among the takeoff authorization procedure tasks on the fourth list, each task of the fourth list being associated with a defect and/or a failure on the aircraft, the defect and/or failure being determined from sensors of the aircraft, to be performed before being authorized to take-off.

19. A task management system of an aircraft crew during a mission, the task management system being connected to or integrated into a central avionics system of the aircraft, the task management system comprising:
   a task sequencing module configured for defining an execution order between tasks to be performed by the crew; and
   a display device, and a display management assembly configured for displaying, on the display device, at least one task sequencing window according to the execution order defined by the task sequencing module,
   the task sequencing module being configured to acquire at least a first list of procedure tasks for normal and special missions to be performed during the mission, a second list of abnormal, emergency and deferred procedure tasks, to be performed in case of defect and/or failures on the aircraft, and a third list of additional tasks resulting from entries by the crew;
   the task sequencing module including a prioritization submodule configured for defining a priority order between the tasks to be performed immediately from among the tasks of the first list, the second list and the third list, and/or the task sequencing module includes a planning submodule configured for defining a planning order between the tasks to be performed later from among the tasks of the first list, the second list and the third list;
   the display management assembly being configured to display, in a cockpit of the aircraft, a first overall task sequencing window including the tasks of the first list, the second list and the third list ranked according to the priority order and/or according to the planning order;
   wherein the first overall sequencing window includes a region for displaying planned tasks to be performed later from among the tasks of the first list, the second list and the third list, the planned tasks being ranked according to the planning order defined by the planning submodule;
   wherein the task sequencing module is configured to acquire relevant mission data comprising waypoints of the aircraft during the mission and passage times at each waypoint, the planning submodule being configured to determine an order among the relevant mission data and the planned tasks;
   wherein the region for displaying planned tasks to be performed later includes a timescale representative of a time period of the mission, the relevant mission data and each planned task being displayed in sequence opposite the timescale.

* * * * *